(12) United States Patent
Chen et al.

(10) Patent No.: US 9,640,129 B2
(45) Date of Patent: May 2, 2017

(54) VOLTAGE ADJUSTMENT CIRCUIT FOR COMMON ELECTRODE AND DISPLAY APPARATUS

(71) Applicants: BOE TECHNOLOGY GROUP CO., LTD., Beijing (CN); HEFEI BOE OPTOELECTRONICS TECHNOLOGY CO., LTD., Hefei, Anhui (CN)

(72) Inventors: Ping Chen, Beijing (CN); Zhiyu Qian, Beijing (CN); Lei Jin, Beijing (CN); Yimin Wang, Beijing (CN)

(73) Assignees: BOE TECHNOLOGY GROUP CO., LTD., Beijing (CN); HEFEI BOE OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 204 days.

(21) Appl. No.: 14/375,636

(22) PCT Filed: Oct. 25, 2013

(86) PCT No.: PCT/CN2013/086001
§ 371 (c)(1),
(2) Date: Jul. 30, 2014

(87) PCT Pub. No.: WO2014/201790
PCT Pub. Date: Dec. 24, 2014

(65) Prior Publication Data
US 2016/0148590 A1 May 26, 2016

(30) Foreign Application Priority Data

Jun. 21, 2013 (CN) .......................... 2013 1 0251103

(51) Int. Cl.
*G09G 3/36* (2006.01)

(52) U.S. Cl.
CPC ......... *G09G 3/3696* (2013.01); *G09G 3/3655* (2013.01); *G02F 2201/121* (2013.01);
(Continued)

(58) Field of Classification Search
CPC ... G09G 2320/0247; G09G 2300/0426; G09G 3/3696
See application file for complete search history.

(56) References Cited

U.S. PATENT DOCUMENTS 4,319,237 A * 3/1982 Matsuo .................... G09G 3/36
345/101
4,788,588 A * 11/1988 Tomita .................. B64D 11/00
345/690

(Continued)

FOREIGN PATENT DOCUMENTS

| CN | 1499478 A | 5/2004 |
|---|---|---|
| CN | 101191919 A | 6/2008 |

(Continued)

OTHER PUBLICATIONS

First Chinese Office Action dated Oct. 23, 2014; Appln. No. 201310251103.0.

(Continued)

*Primary Examiner* — Kent Chang
*Assistant Examiner* — Mark Edwards
(74) *Attorney, Agent, or Firm* — Ladas & Parry LLP

(57) ABSTRACT

Disclosed are a voltage adjustment circuit for a common electrode and a display apparatus, which are capable of improving a sensitivity and a precision in an adjustment of a voltage of the common electrode. The voltage adjustment circuit for the common electrode includes a first fixed resistor, a second fixed resistor and a first adjustable resistor and the voltage adjustment circuit for the common electrode further includes an adjustment module, which is connected (Continued)

to an output terminal of the voltage adjustment circuit for the common electrode and an adjustable terminal of the first adjustable resistor, and is configured to cooperate with the first adjustable resistor to adjust a resistance of the voltage adjustment circuit for the common electrode in order to adjust the output voltage of the common electrode.

14 Claims, 4 Drawing Sheets

(52) U.S. Cl.
CPC ............... *G09G 2300/0426* (2013.01); *G09G 2320/0247* (2013.01)

(56) References Cited

U.S. PATENT DOCUMENTS

2007/0103420 A1* 5/2007 Chao .................... G09G 3/3611
345/98
2009/0207128 A1 8/2009 Chen et al.

FOREIGN PATENT DOCUMENTS

| CN | 102053412 A | 5/2011 |
| CN | 103325356 A | 9/2013 |
| CN | 103578434 A | 2/2014 |
| KR | 20020010320 A | 2/2002 |

OTHER PUBLICATIONS

Chinese Notice of Allowance issued Mar. 2, 2015; Appln. No. 201310251103.0.
International Search Report Appln. No. PCT/CN2013/086001; Dated Mar. 20, 2014.
First Chinese Office Action Appln. No. 201310251103.0; Dated Oct. 23, 2014.
International Preliminary Report on Patentability Appln. No. PCT/CN2013/086001; Dated Dec. 22, 2015.

* cited by examiner

US 9,640,129 B2

VOLTAGE ADJUSTMENT CIRCUIT FOR COMMON ELECTRODE AND DISPLAY APPARATUS

TECHNICAL FIELD OF THE DISCLOSURE

The present disclosure relates to the field of display technology, and particularly to a voltage adjustment circuit for a common electrode and a display apparatus.

BACKGROUND

Liquid crystal (LC) panels have been widely used in display products such as cell phones, smart monitors, LC TV sets, personal computers and so on due to their advantages such as small thinness, high brightness, low radiation and so on.

Usually, the LC panels may have different best voltages at their respective common electrodes since big differences exist among equivalent capacitances of the LC panels. Therefore, when designing a driving circuit of the LC panel, researchers would design a driving circuit with an adjustable resistor. By adjusting the adjustable resistor in the driving circuit, it is possible to realize an adjustment of the voltage at the common electrode such that each LC panel can reach its best voltage at the common electrode. Simultaneously, in order to avoid a flicker phenomenon to exist in pictures displayed on the LC panel, the voltage of the common electrode needs to have a high adjustment precision.

The inventor found that existing voltage adjustment circuits for the common electrode have poor sensitivity and precision in the adjustment, and sometimes cannot adjust the voltage of the common electrode to the most suitable voltage, which affects a display effect of the display apparatus.

SUMMARY

A technical problem to be solved by the present disclosure is to provide a voltage adjustment circuit for a common electrode and a display apparatus, which can improve the sensitivity and precision in the adjustment of the voltage of the common electrode.

A first aspect of the present disclosure provides a voltage adjustment circuit for a common electrode, comprising a first fixed resistor, a second fixed resistor and a first adjustable resistor, wherein a first terminal of the first fixed resistor is connected to a first input terminal of the voltage adjustment circuit for the common electrode, a first terminal of the second fixed resistor is connected to a second input terminal of the voltage adjustment circuit for the common electrode, a first terminal of the first adjustable resistor is connected to a second terminal of the first fixed resistor, and a second terminal of the first adjustable resistor is connected to a second terminal of the second fixed resistor, wherein the voltage adjustment circuit for the common electrode further comprises:

an adjustment module, which is connected to an output terminal of the voltage adjustment circuit for the common electrode and an adjustable terminal of the first adjustable resistor, and configured to cooperate with the first adjustable resistor to adjust a resistance of the voltage adjustment circuit for the common electrode in order to adjust an output voltage of the common electrode.

The adjustment module comprises a second adjustable resistor, wherein a first terminal thereof is connected to the adjustable terminal of the first adjustable resistor, a second terminal thereof is connected to a third fixed voltage terminal, and an adjustable terminal thereof is connected to the output terminal of the voltage adjustment circuit for the common electrode.

Alternatively, the first terminal of the adjustment module is connected to the first terminal of the first adjustable resistor, a second terminal of the adjustment module is connected to the second terminal of the first adjustable resistor, the adjustable terminal of the adjustment module and the adjustable terminal of the first adjustable resistor are connected together to the output terminal of the voltage adjustment circuit for the common electrode.

The adjustment module comprises a second adjustable resistor, wherein a first terminal thereof is connected to the first terminal of the adjustable resistor, a second terminal thereof is connected to the second terminal of the first adjustable resistor, and a adjustable terminal thereof and the adjustable terminal of the first adjustable resistor are connected together to the output terminal of the voltage adjustment circuit for the common electrode.

The adjustment module further comprises a third fixed resistor and a fourth fixed resistor;

the first terminal of the second adjustable resistor being connected to the first terminal of the first adjustable resistor comprises that:

the first terminal of the second adjustable resistor is connected to a first terminal of the third fixed resistor, and a second terminal of the third fixed resistor is connected to the first terminal of the first adjustable resistor and the second terminal of the first fixed resistor; and the second terminal of the second adjustable resistor being connected to the second terminal of the first adjustable resistor comprises that:

the second terminal of the second adjustable resistor is connected to a first terminal of the fourth fixed resistor, and a second terminal of the fourth fixed resistor is connected to the second terminal of the first adjustable resistor and the second terminal of the second fixed resistor.

The voltage adjustment circuit for the common electrode further comprises a first capacitor, wherein a first terminal thereof is connected to the output terminal of the voltage adjustment circuit for the common electrode, and a second terminal thereof is grounded.

The voltage adjustment circuit for the common electrode further comprises a second capacitor, wherein a first terminal thereof is connected to the output terminal of the voltage adjustment circuit for the common electrode, and a second terminal thereof is grounded.

The adjustment module at least further comprises a third adjustable resistor, wherein a first terminal thereof is connected to the first terminal of the second adjustable resistor, a second terminal thereof is connected to the second terminal of the second adjustable resistor, and an adjustable terminal thereof and the adjustable terminal of the second adjustable resistor are connected together to the output terminal of the voltage adjustment circuit for the common electrode.

In the technical solutions of embodiments of the present disclosure, the voltage adjustment circuit for the common electrode has at least two adjustable resistors. The at least two adjustable resistors cooperate to improve the sensitivity and the precision in the adjustment of the output voltage for the common electrode, such that the common electrode has a suitable voltage value to prevent the display apparatus from presenting the flicker phenomenon in the pictures. Further, when one of the adjustable resistors fails due to malfunctions, the other adjustable resistors can still work to remain adjusting the output voltage of the voltage adjustment circuit for the common electrode, which improves an operation reliability of the voltage adjustment circuit for the common electrode.

A second aspect of the disclosure provides a display apparatus comprising a voltage adjustment circuit for a common electrode described in the above.

BRIEF DESCRIPTION OF THE DRAWINGS

In order to explain solutions in embodiments of the present disclosure or the prior art more clearly, drawings required as describing the embodiments of the present disclosure or the prior art will be introduced briefly below. Obviously, the drawings described below only some embodiments of the present disclosure, but those ordinary skilled in the art may obtain other drawings according to these drawings without any inventive labors.

DETAILED DESCRIPTION

Thereafter, solutions of embodiments of the present disclosure will be described clearly and completely in connection with drawings of the embodiments of the present disclosure, but obviously the described embodiments are only some, but not all of the embodiments of the present disclosure. Any other embodiments obtained by those ordinary skilled in the art based on the embodiments of the present disclosure without inventive labors should fall into a scope sought for protection in the present disclosure.

An embodiment of the present disclosure provides a voltage adjustment circuit for a common electrode, comprising a first fixed resistor, a second fixed resistor and a first adjustable resistor, wherein a first terminal of the first fixed resistor is connected to a first input terminal of the voltage adjustment circuit for the common electrode, a first terminal of the second fixed resistor is connected to a second input terminal of the voltage adjustment circuit for the common electrode, a first terminal of the first adjustable resistor is connected to a second terminal of the first fixed resistor, and a second terminal of the first adjustable resistor is connected to a second terminal of the second fixed resistor.

Further, the voltage adjustment circuit for the common electrode further comprises: an adjustment module which is connected to an output terminal of the voltage adjustment circuit for the common electrode and an adjustable terminal of the first adjustable resistor, and is configured to cooperate with the first adjustable resistor to adjust a resistance of the voltage adjustment circuit for the common electrode in order to adjust an output voltage of the common electrode.

Figure 1:
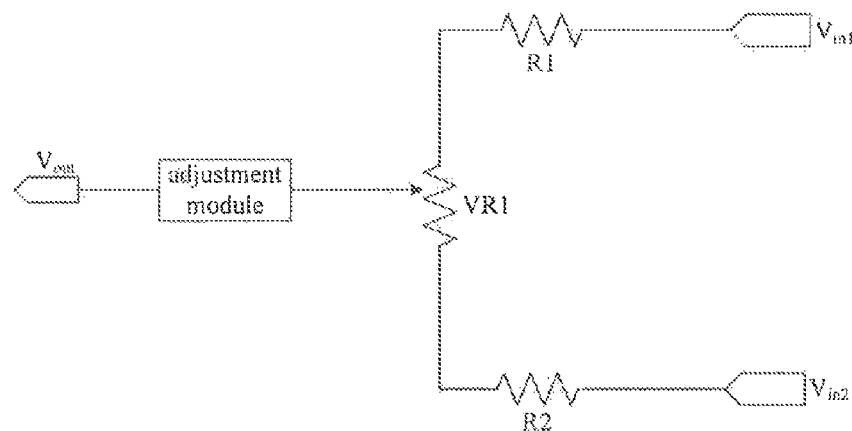
FIG. 1 is a first schematic structural diagram of a voltage adjustment circuit for a common electrode in an embodiment of the present disclosure.

A first manner is as follows, as shown in FIG. 1, there are a first fixed resistor R1, a second fixed resistor R2 and a first adjustable resistor VR1. A first terminal of the first fixed resistor R1 is connected to a first input terminal $V_{in1}$ of the voltage adjustment circuit for the common electrode, a first terminal of the second fixed resistor R2 is connected to a second input terminal $V_{in2}$ of the voltage adjustment circuit for the common electrode, a first terminal of the first adjustable resistor VR1 is connected to a second terminal of the first fixed resistor R1, a second terminal of the first adjustable resistor V1 is connected to a second terminal of the second fixed resistor R2, and an adjustable terminal of the first adjustable resistor VR1 is connected to the output terminal $V_{out}$ of the voltage adjustment circuit for the common electrode.

Further, the voltage adjustment circuit for the common electrode further comprises an adjustment module. At this time, the adjustable terminal of the first adjustable resistor is connected to an output terminal $V_{out}$ of the voltage adjustment circuit for the common electrode through the adjustment module. The adjustment module cooperates with the first adjustable resistor VR1 to adjust the resistance of the voltage adjustment circuit for the common electrode in order to adjust the output voltage of the common electrode. For example, the adjustment module comprises a second adjustable resistor VR2, a first terminal of the second adjustable resistor VR2 is connected to the adjustable terminal of the first adjustable resistor VR1, a second terminal of the second adjustable resistor VR2 is connected to a third fixed voltage terminal, and an adjustable terminal of the second adjustable resistor VR2 is connected to the output terminal $V_{out}$ of the voltage adjustment circuit for the common electrode. In this manner, the adjustment module adjusts the voltage output from the adjustable terminal of the first adjustable resistor VR1 again, which can improve the sensitivity and precision in the adjustment of the voltage adjustment circuit for the common electrode. Of course, a voltage difference between a voltage at the third fixed voltage terminal and the voltage output from the adjustable terminal of the first adjustable resistor VR1 can be set as needed.

In an example, the first input terminal $V_{in1}$ is connected with a first fixed potential, and the second input terminal $V_{in2}$ is connected with a second fixed potential, the second fixed potential is different from the first fixed potential such that a certain voltage $(V_{in1}-V_{in2})$, which is the input voltage of the voltage adjustment circuit for the common electrode, exists between the first input terminal $V_{in1}$ and the second input terminal $V_{in2}$.

Figure 2:
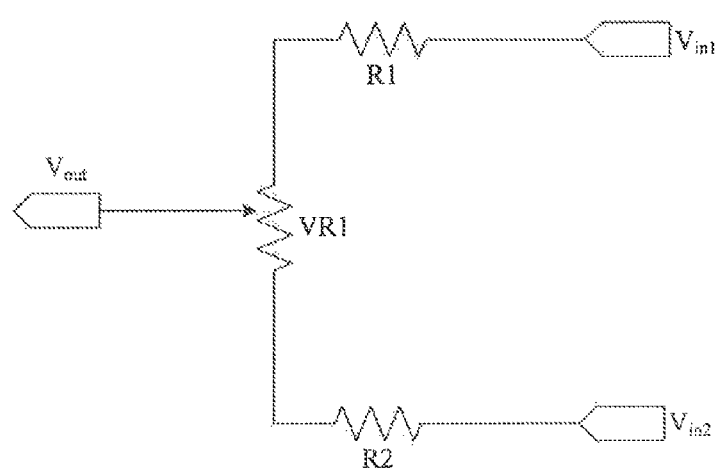
FIG. 2 is a schematic structural diagram of a voltage adjustment circuit for a common electrode in the prior art.

As shown in FIG. 2, in the prior art, a normal voltage adjustment circuit for the common electrode only comprises a first adjustable resistor VR1. Limited by the sensitivity and precision in the adjustment of the first adjustable resistor VR1, sometimes the voltage of the common electrode cannot meet requirements of the display apparatus, which results in occurring of a flicker phenomenon in pictures. In addition, if the first adjustable resistor VR1 fails due to malfunctions, the voltage adjustment circuit for the common electrode cannot work normally and it has to replace the failed first adjustable resistor VR1 to make the voltage adjustment circuit work normally. As a result, the voltage adjustment circuit has a low operation reliability.

In the technical solution of the present embodiment, the voltage adjustment circuit for the common electrode has the adjustment module which cooperates with the first adjustable resistor to adjust the resistance of the voltage adjustment circuit for the common electrode in order to adjust the output voltage of the common electrode. Therefore, the sensitivity and the precision in the adjustment of the output voltage for the common electrode are improved, which enables the common electrode to have a suitable voltage value so as to prevent the display apparatus from presenting the flicker phenomenon in the pictures.

A second manner is as follows. The first terminal of the adjustment module is connected to the first terminal of the first adjustable resistor, the second terminal of the adjustment module is connected to the second terminal of the first adjustable resistor, the adjustable terminal of the adjustment module and the adjustable terminal of the first adjustable resistor are connected together to the output terminal of the voltage adjustment circuit for the common electrode.

Figure 3:
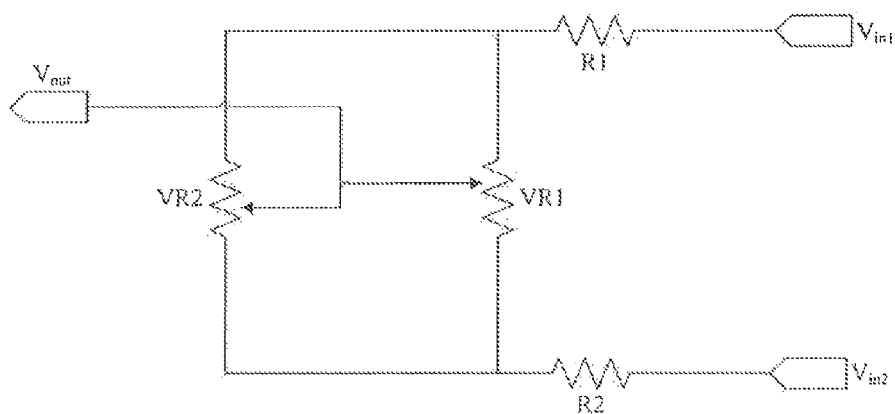
FIG. 3 is a second schematic structural diagram of a voltage adjustment circuit for a common electrode in an embodiment of the present disclosure.

For example, as shown in FIG. 3, the adjustment module may comprise the second adjustable resistor VR2, the first terminal of the second adjustable resistor VR2 is connected to the first terminal of the first adjustable resistor VR1, the second terminal of the second adjustable resistor VR2 is connected to the second terminal of the first adjustable resistor VR1, and the adjustable terminals of the second adjustable resistor VR2 and the first adjustable resistor VR1 are connected together to the output terminal $V_{out}$ of the voltage adjustment circuit for the common electrode.

Figure 4:
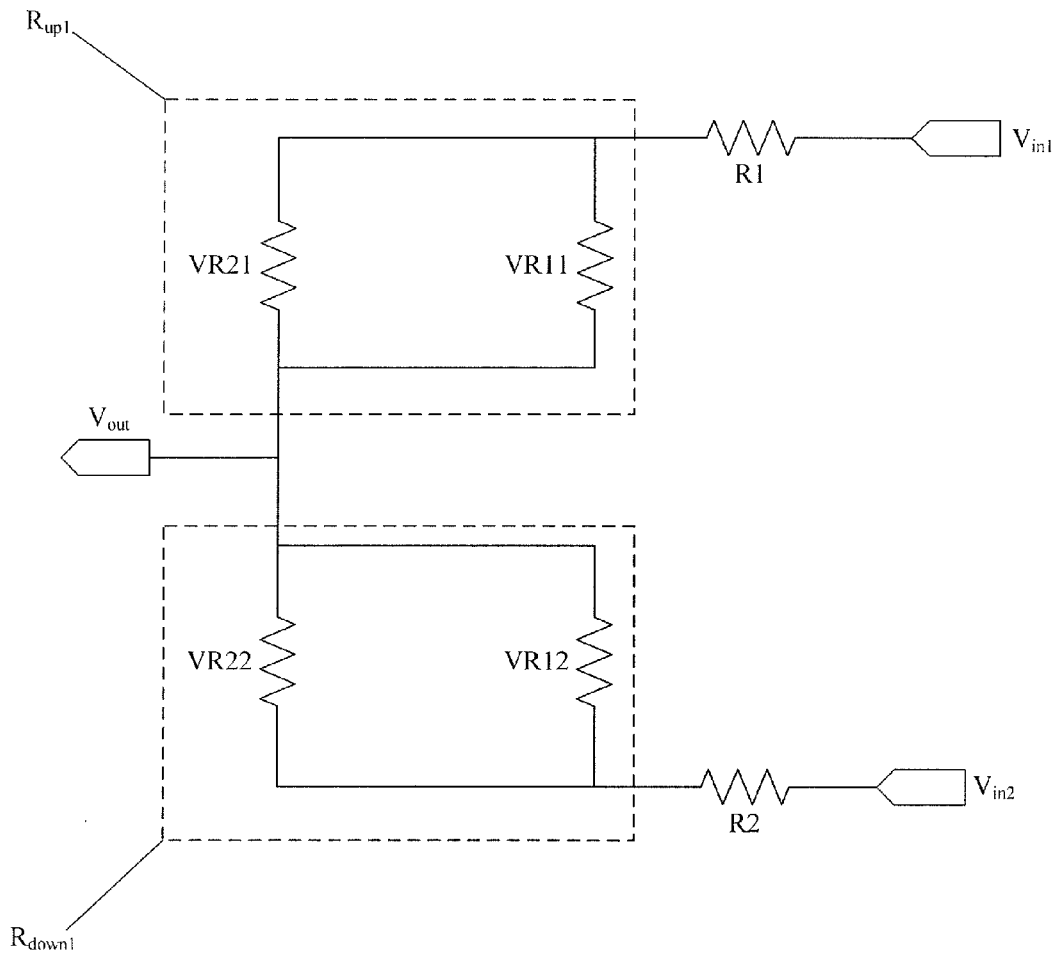
FIG. 4 is a third schematic structural diagram of a voltage adjustment circuit for a common electrode in an embodiment of the present disclosure.

For facilitating analysis, FIG. 4 is an equivalent circuit structure of the circuit structure shown in FIG. 3.

As can be seen from FIG. 3, the first adjustable resistor VR1 is divided into a first-first adjustable resistor VR11 and a first-second adjustable resistor VR12 by its adjustable terminal, and similarly, the second adjustable resistor VR2 is divided into a second-first adjustable resistor VR21 and a second-second adjustable resistor VR22 by its adjustable terminal. In FIG. 4, the first-first adjustable resistor VR11 and the second-first adjustable resistor VR21 are connected in parallel to generate a resistance $R_{up1}$ for this part, and the first-second adjustable resistor VR12 and the second-second adjustable resistor VR22 are connected in parallel to generate a resistance $R_{down1}$ for this part.

Therefore, $$V_{out} = (V_{in1} - V_{in2}) \times \frac{R2 + R_{down1}}{R1 + R_{up1} + R_{down1} + R2} \quad (1)$$

$$\text{where } R_{up1} = \frac{VR11 + VR21}{VR11 \times VR21}, \text{ and} \quad (2)$$

$$R_{down1} = \frac{VR12 + VR22}{VR12 \times VR22}. \quad (3)$$

As can be seen from the expressions (1), (2) and (3), a suitable output voltage $V_{out}$ can be obtained by reasonably assigning the resistances of the first-first adjustable resistor VR11, the first-second adjustable resistor VR12, the second-first adjustable resistor VR21 and the second-second adjustable resistor VR22.

Further, when one of the adjustable resistors fails due to the malfunctions or other reasons, the other adjustable resistor may still work to remain adjusting the output voltage of the voltage adjustment circuit for the common electrode, which improves the operation reliability of the voltage adjustment circuit for the common electrode.

However, if the resistance of the first-first adjustable resistor VR11 is zero, that is, the resistance of the one-second adjustable resistor VR12 is equal to the resistance of the first adjustable resistance VR1, as can be seen from FIG. 4, the second-first adjustable resistor VR21 is short-circuited by the first-first adjustable resistor VR11, such that the overall resistance of the voltage adjustment circuit for the common electrode is small, and thus currents flowing through the first fixed resistor R1 and the second fixed resistor R2 would be large, which may damage the first fixed resistor R1, the second fixed resistor R2 and other electrical devices and influence the normal usage of the voltage adjustment circuit for the common electrode.

In order to avoid an occurrence of such bad effects, the adjustment module may further comprise a third fixed resistor R3 and a fourth fixed resistor R4. Now, as shown in FIG. 5, the first terminal of the second adjustable resistor VR2 is connected to a first terminal of the third fixed resistor R3, and a second terminal of the third fixed resistor R3 is connected to the first terminal of the first adjustable resistor VR1 and the second terminal of the first fixed resistor R1; and the second terminal of the second adjustable resistor VR2 is connected to a first terminal of the fourth fixed resistor R4, and a second terminal of the fourth fixed resistor R4 is connected to the second terminal of the first adjustable resistor VR1 and the second terminal of the second fixed resistor R2.

Figure 5:
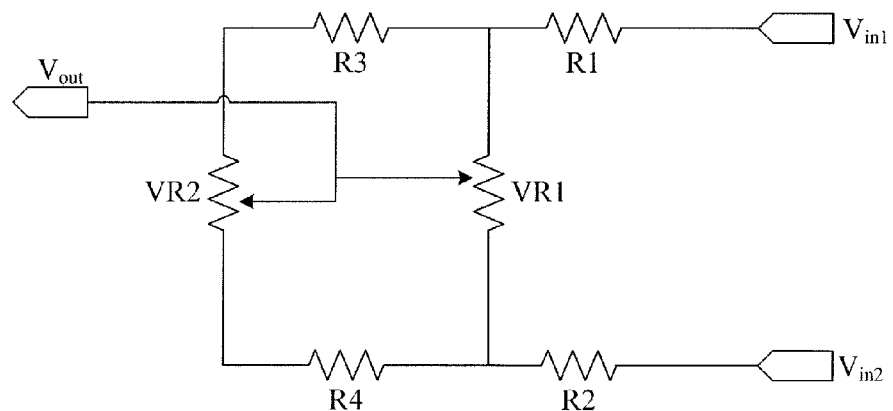
FIG. 5 is a fourth schematic structural diagram of a voltage adjustment circuit for a common electrode in an embodiment of the present disclosure.
Figure 6:
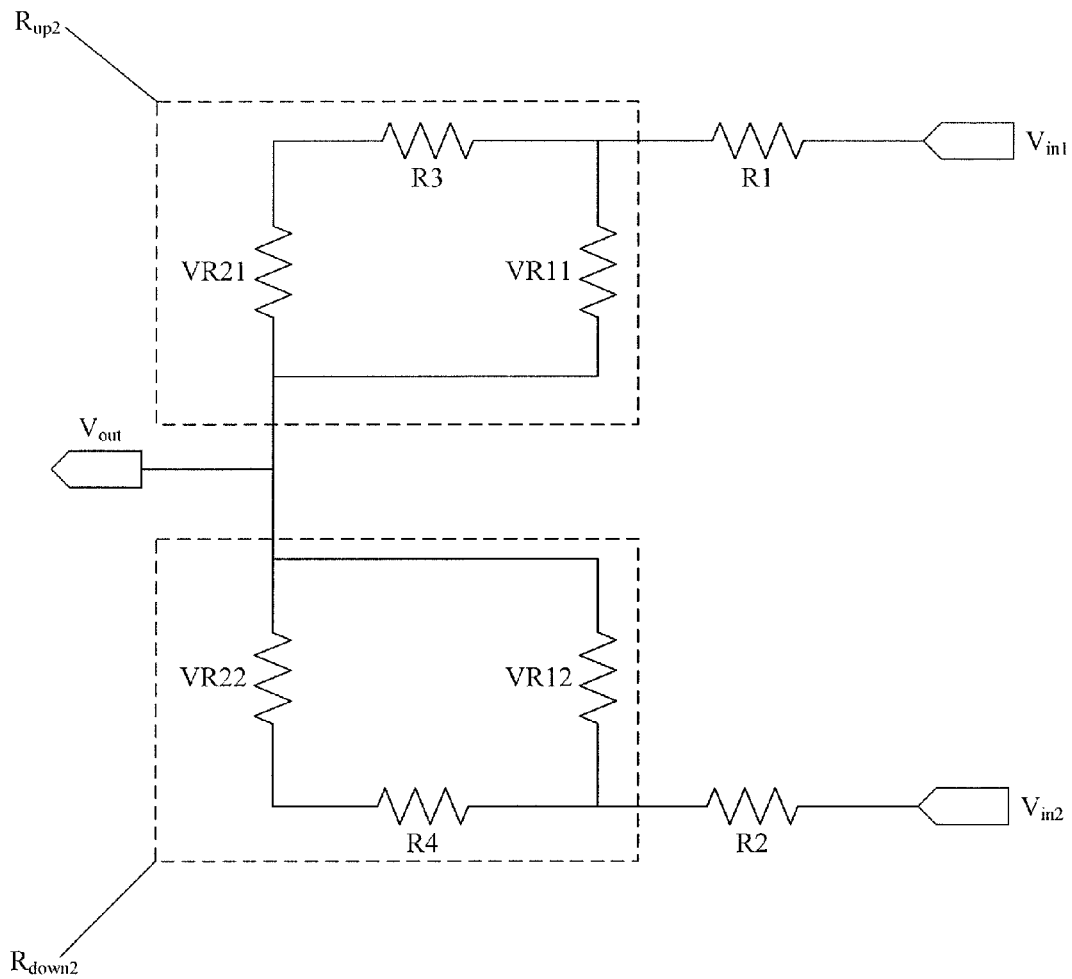
FIG. 6 is a fifth schematic structural diagram of a voltage adjustment circuit for a common electrode in an embodiment of the present disclosure.

In order to describe the structure of the voltage adjustment circuit for the common electrode shown in FIG. 5 more conveniently and intuitively, the structure shown in FIG. 5 can be equivalent to the structure shown in FIG. 6. As can be seen from FIG. 6, the first adjustable resistor VR1 is divided into the first-first adjustable resistor VR11 and the first-second adjustable resistor VR12 by its adjustable terminal, and similarly, the second adjustable resistor VR2 is divided into the second-first adjustable resistor VR21 and the second-second adjustable resistor VR22 by its adjustable terminal. The second-first adjustable resistor VR21 is connected to the third fixed resistor R3 in series, and then they are commonly connected with the first-first adjustable resistor VR11 in parallel, which generates a resistance $R_{up2}$. The second-second adjustable resistor VR22 is connected to the fourth fixed resistor R4 in series, and then they are common connected with the first-second adjustable resistor VR12 in parallel, which generates a resistance $R_{down2}$. Then the structure shown in FIG. 6 can be simplified as that the first fixed resistor R1, $R_{up2}$, $R_{down2}$ and the second fixed resistor R2 are connected in series.

Therefore, $$V_{out} = (V_{in1} - V_{in2}) \times \frac{R2 + R_{down2}}{R1 + R_{up2} + R_{down2} + R2} \quad (4)$$

$$\text{where } R_{up2} = \frac{VR11 + VR21 + R3}{VR11 \times (VR21 + R3)}, \text{ and} \quad (5)$$

$$R_{down2} = \frac{VR12 + VR22 + R4}{VR12 \times (VR22 + R4)}. \quad (6)$$

As can be seen from the expressions (4), (5) and (6), the adjustment of the voltage value output from the output terminal $V_{out}$ of the voltage adjustment circuit for the common electrode can be realized by reasonably assigning the resistances of the first-first adjustable resistor VR11, the first-second adjustable resistor VR12, the second-first adjustable resistor VR21 and the second-second adjustable resistor VR22, i.e., by reasonably adjusting the adjustment terminals of the first adjustable resistor VR1 and the second adjustable resistor VR2. The precision and the sensitivity of the adjustment are both high.

Further, if the first adjustable resistor VR1 fails, for example, if the first adjustable resistor VR1 is open-circuited or cannot adjust its resistance, the voltage adjustment circuits for the common electrode as shown in FIG. 3, FIG. 4, FIG. 5 and FIG. 6 can still realize the adjustment of their output voltages by adjusting the second adjustable resistor VR2, such that the common electrode can obtain a voltage value meeting the requirements of the display apparatus.

Exemplarily, in an embodiment of the present disclosure, adjustment ranges of the first adjustable resistor VR1 and the second adjustable resistor VR2 are both 0-2.2 kΩ. The resistance of the first fixed resistor R1 can set as 3.32 kΩ. The resistances of the second fixed resistor R2 and the third fixed resistor R3 can be set as 1 kΩ. The resistance of the fourth fixed resistor R4 can set as 2.2 kΩ In particular, the resistances of the fixed resistors or the adjustable resistors can be selected after determining a range of the output voltage of the voltage adjustment circuit by detailed calculations based on a screen size of the practical display apparatus.

In practical use, the second input terminal $V_{in2}$ of the voltage adjustment circuit may be grounded, and at this time the input voltage of the voltage adjustment circuit is the potential value input from the first input terminal $V_{in1}$.

Figure 7:
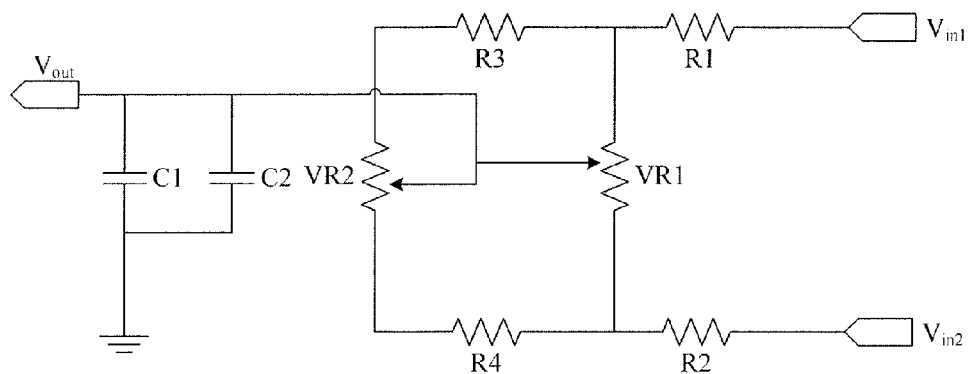
FIG. 7 is a sixth schematic structural diagram of a voltage adjustment circuit for a common electrode in an embodiment of the present disclosure.

Any electrical signal would be influenced by factors such as electrical devices to carry noises during transmission. In order to eliminate the noise in the voltage value output from the output terminal $V_{out}$ of the voltage adjustment circuit for the common electrode, as shown in FIG. 7, the voltage adjustment circuit for the common electrode may further comprise a first capacitor C1 whose first terminal is connected to the output terminal $V_{out}$ of the voltage adjustment circuit for the common electrode, and whose second terminal is grounded. The first capacitor C1 is used to reduce the noise in the voltage value output from the voltage adjustment electrode for the common electrode, in order to improve the operation reliability of the voltage adjustment circuit for the common electrode.

As shown in FIG. 7, in order to avoid that the failure of the first capacitor C1 due to its malfunctions influences the operation reliability of the voltage adjustment circuit for the common electrode, the voltage adjustment circuit for the common electrode may further comprise a second capacitor C2 whose first terminal is connected to the output terminal $V_{out}$ of the voltage adjustment circuit for the common electrode, and whose second terminal is grounded. In other words, the second capacitor C2 is connected to the first capacitor C1 in parallel.

Figure 8:
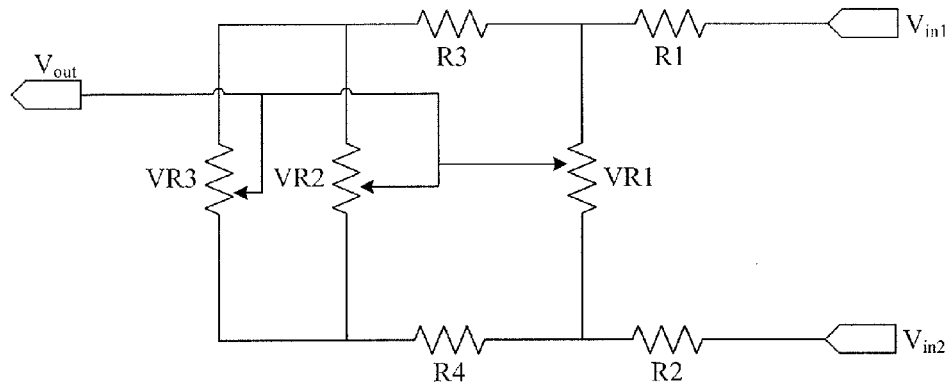
FIG. 8 is a seventh schematic structural diagram of a voltage adjustment circuit for a common electrode in an embodiment of the present disclosure.

In order to further improve the operation reliability and the sensitivity and precision in the adjustment of the voltage adjustment circuit for the common electrode, as shown in FIG. 8, the voltage adjustment circuit for the common electrode may further comprise a third adjustable resistor VR3, a first terminal of the third adjustable resistor VR3 is connected to the first terminal of the second adjustable resistor VR2, a second terminal of the third adjustable resistor VR3 is connected to the second terminal of the second adjustable resistor VR2, and an adjustable terminal of the third adjustable resistor VR3 is connected to the adjustable terminal of the second adjustable resistor VR2.

Figure 9:
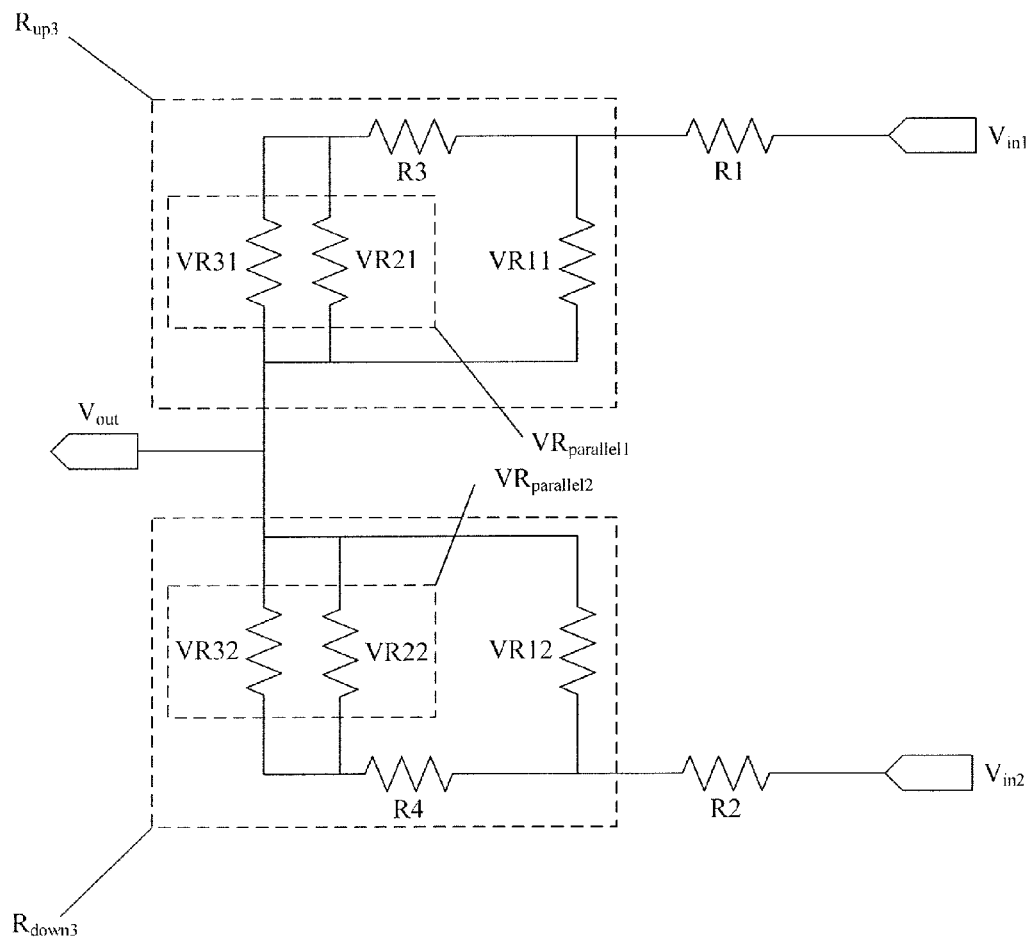
FIG. 9 is a eighth schematic structural diagram of a voltage adjustment circuit for a common electrode in an embodiment of the present disclosure.

Similar to the above, the voltage adjustment circuit for the common electrode shown in FIG. 8 can be equivalent to the structure shown in FIG. 9. As can be seen from FIG. 9, the third adjustable resistor VR3 is divided into a third-first adjustable resistor VR31 and a third-second adjustable resistor VR32 by its adjustable terminal. The third-first adjustable resistor VR31 is connected to the second-first adjustable resistor VR21 in parallel, and the third-second adjustable resistor VR32 is connected to the second-second adjustable resistor VR22 in parallel. Then, it can be known in connection with the above that the second-first adjustable resistor VR21 is connected to the third-first adjustable resistor VR31 in parallel, and a resistance after such parallel connection may be referred to as $VR_{parallel1}$; the $VR_{parallel1}$ is connected to the third fixed resistor R3 in series and then is commonly connected to the first-first adjustable resistor VR11 in parallel, which generates a resistance of $R_{p3}$. Similarly, the second-second adjustable resistor VR22 is connected to the third-second adjustable resistor VR32 in parallel, a resistance after such parallel connection may be referred to as $VR_{parallel2}$; the $VR_{parallel2}$ is connected to the fourth fixed resistor R4 in series and then is commonly connected to the first-second adjustable resistor VR12, which generates a resistance of $R_{down3}$. Then the structure shown in FIG. 9 can be simplified as that the first fixed resistor R1, $R_{up3}$, $R_{down3}$ and the second fixed resistor R2 are connected in series.

Therefore, $$V_{out} = (V_{in1} - V_{in2}) \times \frac{R2 + R_{down3}}{R1 + R_{up3} + R_{down3} + R2} \quad (7)$$

$$\text{where } R_{up3} = \frac{VR11 + VR_{parallel1} + R3}{VR11 \times (VR_{parallel1} + R3)}, \quad (8)$$

$$R_{down3} = \frac{VR12 + VR_{parallel2} + R4}{VR12 \times (VR_{parallel2} + R4)}, \quad (9)$$

$$\text{where } VR_{parallel1} = \frac{VR21 + VR31}{VR21 \times VR31}, \text{ and} \quad (10)$$

$$VR_{parallel2} = \frac{VR22 + VR31}{VR22 \times VR32}. \quad (11)$$

Combining the expressions (8) and (10), compared with equation (5), it can be seen that the sensitivity and precision of the change of $R_{up3}$ are higher than those of $R_{up2}$, and similarly the sensitivity and precision of the change of $R_{down3}$ are higher than those of $R_{down2}$. Therefore, it can be known that the sensitivity and precision of the change of $V_{out}$ in equation (7) are higher than those of $V_{out}$ in equation (4).

In addition, the voltage adjustment circuit for the common electrode with the three adjustable resistors has a higher reliability and a longer lifetime than the voltage adjustment circuit for the common electrode with the two adjustable resistors.

An embodiment of the present disclosure also provides a display apparatus comprising any voltage adjustment circuit for a common electrode described in the above. The display apparatus can be any product or means with the display function such as a liquid crystal panel, an electronic paper, an OLED panel, a cell phone, a plate computer, a TV set, a display, a notebook computer, a digital photo frame, a navigator and so on.

The above descriptions only illustrate the specific embodiments of the present invention, and the protection scope of the present invention is not limited to this. Given the teaching as disclosed herein, variations or substitutions, which can easily occur to any skilled pertaining to the art, should be covered by the protection scope of the present invention. Thus, the protection scope of the present invention is defined by the claims.

What is claimed is:

1. A voltage adjustment circuit for a common electrode, comprising a first fixed resistor, a second fixed resistor and a first adjustable resistor, wherein a first terminal of the first fixed resistor is connected to a first input terminal of the voltage adjustment circuit for the common electrode, a first terminal of the second fixed resistor is connected to a second input terminal of the voltage adjustment circuit for the common electrode, a first terminal of the first adjustable resistor is connected to a second terminal of the first fixed resistor, and a second terminal of the first adjustable resistor is connected to a second terminal of the second fixed resistor, wherein the voltage adjustment circuit for the common electrode further comprises:
   an adjustment module, which is connected to an output terminal of the voltage adjustment circuit for the common electrode and an adjustable terminal of the first adjustable resistor, and is configured to cooperate with the first adjustable resistor to adjust a resistance of the voltage adjustment circuit for the common electrode in order to adjust an output voltage of the common electrode,
   wherein a first terminal of the adjustment module is connected to the first terminal of the first adjustable resistor, a second terminal of the adjustment module is connected to the second terminal of the first adjustable resistor, and an adjustable terminal of the adjustment module and the adjustable terminal of the first adjustable resistor are connected together to the output terminal of the voltage adjustment circuit for the common electrode.

2. The voltage adjustment circuit for the common electrode according to claim 1, wherein the adjustment module comprises a second adjustable resistor, a first terminal of the second adjustable resistor is connected to the adjustable terminal of the first adjustable resistor, a second terminal of the second adjustable resistor is connected to a third fixed voltage terminal, and an adjustable terminal of the second adjustable resistor is connected to the output terminal of the voltage adjustment circuit for the common electrode.

3. The voltage adjustment circuit for the common electrode according to claim 2, wherein the adjustment module comprises a second adjustable resistor, a first terminal of the second adjustable resistor is connected to the first terminal of the first adjustable resistor, a second terminal of the second adjustable resistor is connected to the second terminal of the first adjustable resistor, and an adjustable terminal of the second adjustable resistor and the adjustable terminal of the first adjustable resistor are connected together to the output terminal of the voltage adjustment circuit for the common electrode.

4. The voltage adjustment circuit for the common electrode according to claim 3, wherein the adjustment module further comprises a third fixed resistor and a fourth fixed resistor;
   the first terminal of the second adjustable resistor being connected to the first terminal of the first adjustable resistor comprises that:
   the first terminal of the second adjustable resistor is connected to a first terminal of the third fixed resistor, and a second terminal of the third fixed resistor is connected to the first terminal of the first adjustable resistor and the second terminal of the first fixed resistor; and
   the second terminal of the second adjustable resistor being connected to the second terminal of the first adjustable resistor comprises that
   the second terminal of the second adjustable resistor is connected to a first terminal of the fourth fixed resistor, and a second terminal of the fourth fixed resistor is connected to the second terminal of the first adjustable resistor and the second terminal of the second fixed resistor.

5. The voltage adjustment circuit for the common electrode according to claim 4, further comprising:
   a first capacitor, a first terminal of the first capacitor is connected to the output terminal of the voltage adjustment circuit for the common electrode, and a second terminal of the first capacitor is grounded.

6. The voltage adjustment circuit for the common electrode according to claim 5, further comprising:
   a second capacitor, a first terminal of the second capacitor is connected to the output terminal of the voltage adjustment circuit for the common electrode, and a second terminal of the second capacitor is grounded.

7. The voltage adjustment circuit for the common electrode according to claim 3, wherein
   the adjustment module at least further comprises a third adjustable resistor, a first terminal of the third adjustable resistor is connected to the first terminal of the second adjustable resistor, a second terminal of the third adjustable resistor is connected to the second terminal of the second adjustable resistor, and an adjustable terminal of the third adjustable resistor and the adjustable terminal of the second adjustable resistor are connected together to the output terminal of the voltage adjustment circuit for the common electrode.

8. A display apparatus, comprising a voltage adjustment circuit for a common electrode, wherein the voltage adjustment circuit for the common electrode comprises a first fixed resistor, a second fixed resistor and a first adjustable resistor, wherein a first terminal of the first fixed resistor is connected to a first input terminal of the voltage adjustment circuit for the common electrode, a first terminal of the second fixed resistor is connected to a second input terminal of the voltage adjustment circuit for the common electrode, a first terminal of the first adjustable resistor is connected to a second terminal of the first fixed resistor, and a second terminal of the first adjustable resistor is connected to a second terminal of the second fixed resistor, wherein the voltage adjustment circuit for the common electrode further comprises:
   an adjustment module, which is connected to an output terminal of the voltage adjustment circuit for the common electrode and an adjustable terminal of the first adjustable resistor, and is configured to cooperate with the first adjustable resistor to adjust a resistance of the voltage adjustment circuit for the common electrode in order to adjust an output voltage of the common electrode,
   wherein a first terminal of the adjustment module is connected to the first terminal of the first adjustable resistor, a second terminal of the adjustment module is connected to the second terminal of the first adjustable resistor, and an adjustable terminal of the adjustment module and the adjustable terminal of the first adjustable resistor are connected together to the output terminal of the voltage adjustment circuit for the common electrode.

9. The display apparatus according to claim 8, wherein the adjustment module comprises a second adjustable resistor, a first terminal of the second adjustable resistor is connected to the adjustable terminal of the first adjustable resistor, a second terminal of the second adjustable resistor is connected to a third fixed voltage terminal, and an adjustable terminal of the second adjustable resistor is connected to the output terminal of the voltage adjustment circuit for the common electrode.

10. The voltage adjustment circuit for the common electrode according to claim 9, wherein the adjustment module comprises a second adjustable resistor, a first terminal of the second adjustable resistor is connected to the first terminal of the first adjustable resistor, a second terminal of the second adjustable resistor is connected to the second terminal of the first adjustable resistor, and an adjustable terminal of the second adjustable resistor and the adjustable terminal of the first adjustable resistor are connected together to the output terminal of the voltage adjustment circuit for the common electrode.

11. The display apparatus according to claim 10, wherein the adjustment module further comprises a third fixed resistor and a fourth fixed resistor;
the first terminal of the second adjustable resistor being connected to the first terminal of the first adjustable resistor comprises that:
the first terminal of the second adjustable resistor is connected to a first terminal of the third fixed resistor, and a second terminal of the third fixed resistor is connected to the first terminal of the first adjustable resistor and the second terminal of the first fixed resistor; and
the second terminal of the second adjustable resistor being connected to the second terminal of the first adjustable resistor comprises that
the second terminal of the second adjustable resistor is connected to a first terminal of the fourth fixed resistor, and a second terminal of the fourth fixed resistor is connected to the second terminal of the first adjustable resistor and the second terminal of the second fixed resistor.

12. The display apparatus according to claim 11, further comprising:
a first capacitor, a first terminal of the first capacitor is connected to the output terminal of the voltage adjustment circuit for the common electrode, and a second terminal of the first capacitor is grounded.

13. The display apparatus according to claim 12, further comprising:
a second capacitor, a first terminal of the second capacitor is connected to the output terminal of the voltage adjustment circuit for the common electrode, and a second terminal of the second capacitor is grounded.

14. The display apparatus according to claim 10, wherein the adjustment module at least further comprises a third adjustable resistor, a first terminal of the third adjustable resistor is connected to the first terminal of the second adjustable resistor, a second terminal of the third adjustable resistor is connected to the second terminal of the second adjustable resistor, and an adjustable terminal of the third adjustable resistor and the adjustable terminal of the second adjustable resistor are connected together to the output terminal of the voltage adjustment circuit for the common electrode.

* * * * *